United States Patent [19]
Barbier

[11] 3,736,554
[45] May 29, 1973

[54] SEISMIC EXPLORATION

[75] Inventor: Maurice Barbier, Ousse, France

[73] Assignee: Societe Anonyme dite: Societe Nationale Des Petroles D'Aquitaine, County of Courbevoie, France

[22] Filed: June 19, 1969

[21] Appl. No.: 834,813

[30] Foreign Application Priority Data

June 27, 1968 France..............................68156787

[52] U.S. Cl.......340/7 R, 340/15.5 CC, 340/15.5 CP
[51] Int. Cl................................................G01v 1/38
[58] Field of Search................340/15.5 CC, 15.5 CP, 340/7 R

[56] References Cited

UNITED STATES PATENTS

| | | | |
|---|---|---|---|
| 3,332,511 | 7/1967 | Silverman | 340/15.5 RC |
| 3,413,596 | 11/1968 | Backus et al. | 340/15.5 CC |

Primary Examiner—Benjamin A. Borchelt
Assistant Examiner—N. Moskowitz
Attorney—Bacon & Thomas

[57] ABSTRACT

Seismic exploration is effected using a seismic transmitter and at least one receiver which are moved in a continuous manner at a constant distance apart while the transmitter transmits a continuous series of long signals and the received signals are recorded without interruption. The transmitted signals are then correlated with corresponding parts of recorded signals to obtain seismic information.

5 Claims, 7 Drawing Figures

SEISMIC EXPLORATION

The present invention relates to the exploration of an area by the transmission of energy and, particularly, to geophysical prospecting using seismic techniques in which a transmitter of long signals is moved in a continuous manner, accompanied at a constant distance by one or more receiving units for recording the mechanical waves. The invention is particularly applicable, for example, to undersea seismic prospecting.

Figure 1:
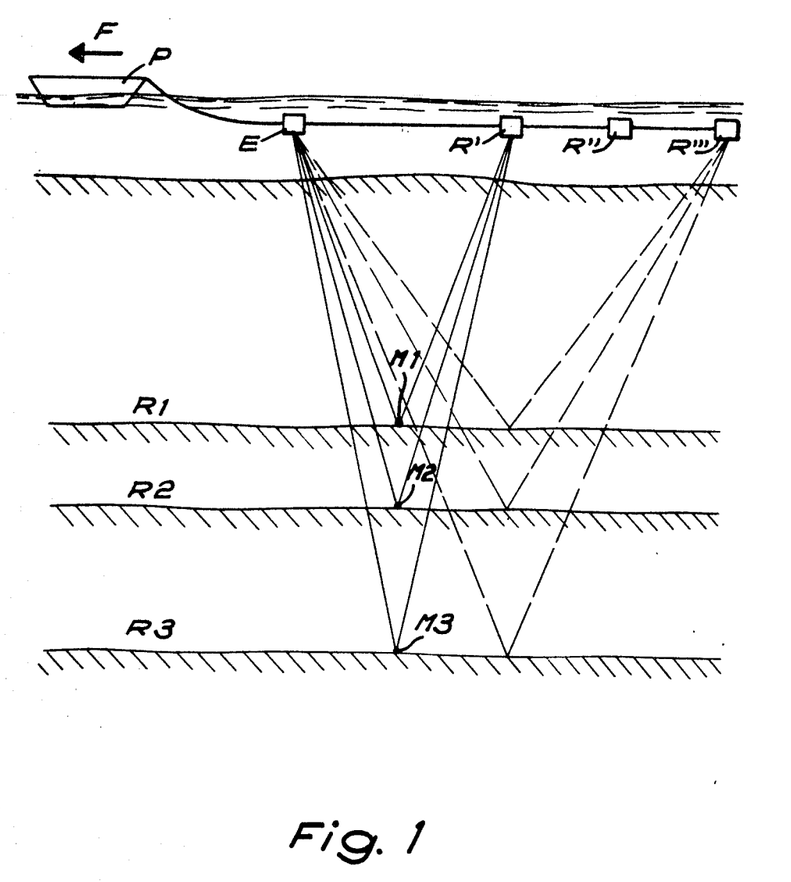
FIG. 1 illustrates the principle of underwater seismic prospecting.

FIG. 1 illustrates the principle of such a method: a vessel P moving in the direction of the arrow F tows a transmitter E of mechanical waves in the water and also a series of receivers, R', R'' and R''', the respective distances of which from the transmitter E remain the same. The mechanical waves set up by the transmitter E penetrate the earth's crust, and certain of their components return to the receivers R', R'' and R''', after having been reflected once at the interfaces $R_1$, $R_2$ and $R_3$ of geological strata of different compositions, these interfaces being called "reflectors." The points of incidence $M_1$, $M_2$ and $M_3$ of the waves sent to the receiver R' are called "mirror points". The receivers R', R'' and R''' are connected to a recorder. Each recording sequence begins when the transmission of waves starts and it is stopped only after a listening period equal to the duration T of the transmitted signal, plus a period of silence $\theta$, corresponding to the travel time, between the transmitter and receiver in question, of the waves reaching the deepest reflector.

In the conventional impulse method, the transmission time is practically zero, the duration of the mechanical shock set up in the earth by a single impulse itself being very short. On the other hand, in the so-called long signal methods, now very well known, the transmitter E causes series of mechanical waves to be propagated, starting with a signal the transmission time T of which s long in relation to the duration of the shock set up by a single impulse. In order to impart a characteristic form to the long signal, its frequency and/or its amplitude is varied so that none of its components is identically repeated during the transmission time T. The long signal can, for example, consist of a sinusoidal vibration of variable frequency or of a succession of trains of closely spaced impulses, the envelope of which is also of variable frequency. A seismic prospecting method might also be used employing long signals constituted by a series of discrete impulses of substantially constant amplitude, the rate of occurrence of these impulses being preferably random. These impulses can be set up by, for example, spark generators or gas-guns.

In the long signal methods, the signals, recorded by the receiver and corresponding to the reflections of the transmitted waves on the various reflectors cannot generally be distinguished from the signals resulting from the surrounding noise in the recording. Furthermore, the various long signals received after reflection on the various reflectors do not overlap in the recording. The recording therefore has to be processed to enable the information it contains to be utilized. If the amplitude of the long signal transmitted during the period T conforms to a variation rate as a function of the time F(t), the intercorrelation function of F(t) with the signal recorded is determined; the maxima of this intercorrelation function have for abscissae the travel times $\tau_1$, $\tau_2$, and $\tau_3$ of the waves reflected by the reflectors $R_1$, $R_2$ and $R_3$.

The function F(t) and the duration of the transmission T are determined particularly with a view to minimizing the relative size of the secondary peaks or lobes of the intercorrelation function, which are known as "correlation residues." These factors are determined by studying the auto-correlation function of the signal having a duration T.

In marine prospecting using long signals, the prospecting vessel moves continuously and the transmitter and the receivers are displaced between the start and finish of the transmission time T of the long signal. The mirror point M corresponding to a given reflector is also displaced during this time: the start of the signal received corresponds to a mirror point different from that at the end of the signal. Nevertheless, with the vessel moving forward at a speed which is low in relation to the variation in the profile of the reflectors being explored, it can be considered that, for a sufficiently brief period of transmission T, the information received along the segment scanned by the mirror point M between the start and finish of the signal is of importance, from the geological point of view, as regards only one point on the reflector. In other words, taking into account the speed of forward movement of the vessel, beyond a certain duration of the transmission of each signal, the segment scanned by the mirror point during the time T will be too long to furnish information that can be considered as characterizing a point on the reflector, and the definition of the profile of the latter will suffer as a result; this is true particularly when the dip in the reflectors is considerable. The greater the speed of the vessel (high speeds favor good use of the prospecting vessel) the more the duration of the transmission of the signal has to be reduced.

The detection of a reflector situated at a given depth, however, requires a sufficient mechanical energy to be sent into the seabed. It is possible to transmit this energy in a form in which it is broken up, over a period, to varying extents; the shorter the duration of the signal, the greater must be the power of the transmitter which produces the mechanical waves in the area to be prospected. It is therefore desirable to utilize the full capacity of the installation in order to obtain full benefit from it.

In present-day prospecting techniques, the transmission of each long signal having a duration T is, as already explained, followed by a period of silence $\theta$ of a duration at least equal to the time during which the waves travel to and from the deepest reflector. Each listening time $T + \theta$ enables a segment of the reflector, representative of one point, to be scanned. The transmission time T — period of silence $\theta$ is repeated to obtain traces defining other points on the reflector. If V is the speed of the vessel, the points thus determined are separated by $V(T + \theta)$.

It is an object of the present invention to improve the conditions for using the exploration equipment in the case where the transmitter and the receiver or receivers are continuously displaced, with a view to determining the reflectors of the area in a more precise manner, while at the same time increasing the performance of the equipment.

The invention provides a method of exploring an area, in which method a long signal transmitter is moved in a continuous manner while it is accompanied at a constant distance by at least one receiver which receives the signals resulting from the reflection of the transmitted signals on at least one reflector during a period of time at least equal to the duration of the emitted signal, which signals are recorded, wherein the long signals, which have a duration of at least equal to the travel time of the waves sent back to the receiver by the most distant reflector, follow each other in a continuous manner, while the recording of the resultant signals takes place without interruption during the duration of the exploration of the area in question, the transmitted signals being then correlated (which may be done in a manner known per se) with the corresponding portions of the recorded signals so as to obtain successive traces characterizing the successive points on each reflector explored.

The following description will show the very considerable advantages of the above defined method, for example in undersea seismic prospecting. These include allowing for an increase in the energy transmitted per kilometer of profile explored, use of the recordings obtained for providing traces characterizing intermediate points between two points on a reflector corresponding to two successively transmitted long signals and also enabling certain restrictions concerning, in particular, the determination of the duration of the signals which are present in the conventional long signal methods to be avoided.

The conditions for operating the method just defined are as follows: the distance between the transmitter and the receiver in question has to be constant, the transmitter and receiver must be moved in a continuous manner, and the duration T of a long signal, which is characterized in that its variation rate is not cyclic during this period, has to be at least equal to the time $\theta$ taken by the waves leaving the transmitter to reach the receiver after having been reflected at the deepest reflector detected. This last condition is necessary if it is desired to avoid mixing, at the moment of recording, the signals corresponding to the beginning of the long signal which are reflected by the deepest reflector with the signals corresponding to the start of the identical following signal which are reflected by the shallowest reflectors. Such a mixture would render the results of the intercorrelation operation valueless, or at least of less value.

Figure 2:
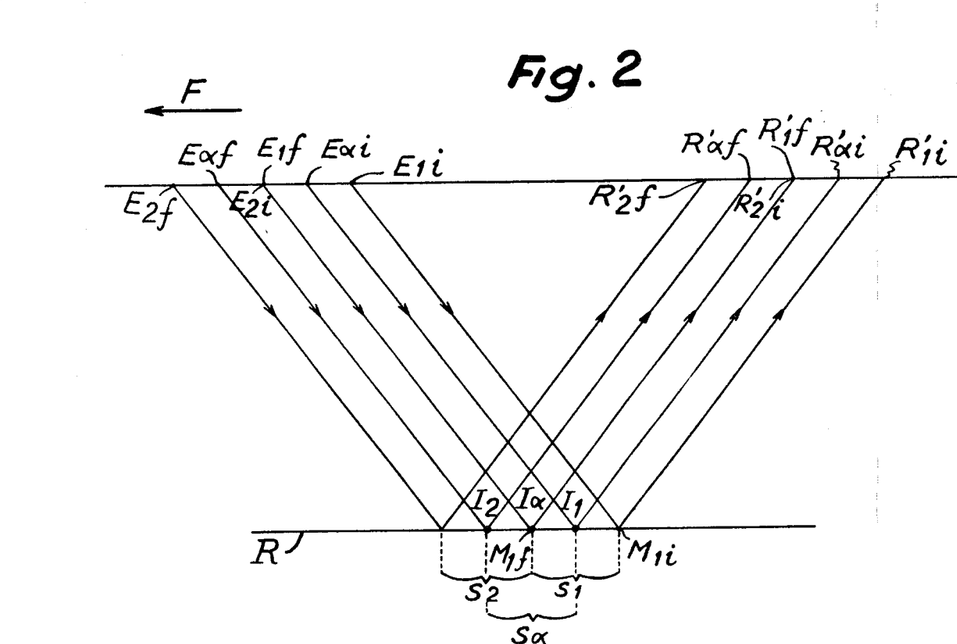
FIG. 2 illustrates one method of carrying the present invention into effect.

FIG. 2 shows successive positions of a transmitter E spaced from a receiver R', which both move towards the left of the figure, emits with the transmitter transmitting signals which are then reflected by a reflector R which is here assumed to contain no dip. The respective positions of the transmitter, the receiver and of the mirror point M on the reflector are defined by indices.

Nothing is changed of course if, instead of a single receiver, there are several receivers, R', R" and R''', as is generally the case.

Taking a first signal sent out by the transmitter E and having a duration T, the commencement of the signal is sent out at the point $E_{1i}$ and the end of the signal is transmitted at the point $E_{1f}$. It is received between the points $R'_{1i}$ and $R'_{1f}$. The mirror point $M_1$ has scanned a segment $S_1$ between the points $M_{1i}$ and $M_{1f}$. The seismic trace obtained by intercorrelation starting with the signals recorded by R' enables the middle point $I_1$ of the segment $S_1$ to be determined. Immediately after the end of the transmission of the first signal at $E_{1f}$ there commences a new transmission having a duration T or positions of the transmitter between $E_{2i}$ (which is identical with $E_{1f}$) and $E_{2f}$; this transmission will lead to the recording of a signal, the seismic trace of which is representative of the middle point $I_2$ of the segment $S_2$. If the energy of each of these long signals lasting a period of T is sufficient, the depth of the points $I_1$ and $I_2$ is then determined directly by intercorrelation of the successively transmitted long signals with the corresponding portions of the signals received.

When the transmission and recording are discontinued, the transmission and the recording having started at the same moment, the transmission stops at the end of the period T and recording at the end of the period $T + \theta$: it is the signal recorded during this period $T + \theta$ that is intercorrelated with the transmitted signal having a duration T: if $n$ long signals have been transmitted, each followed by a period of silence $\theta$, there are $n$ portions having a duration of $T + \theta$ in the signal recorded, and each one is intercorrelated with the transmitted signal of the same class.

When the transmission and recording are continued, the first signal transmitted is intercorrelated with the initial portion of the recorded signal having a duration $T + \theta$, and the transmitted signal of class $n$ is intercorrelated with the portion of the received signal starting at the moment $nT$ and also having a duration $T + \theta$; it is this portion of the received signal which is called the portion corresponding to the transmitted signal of class $n$.

Figure 3:
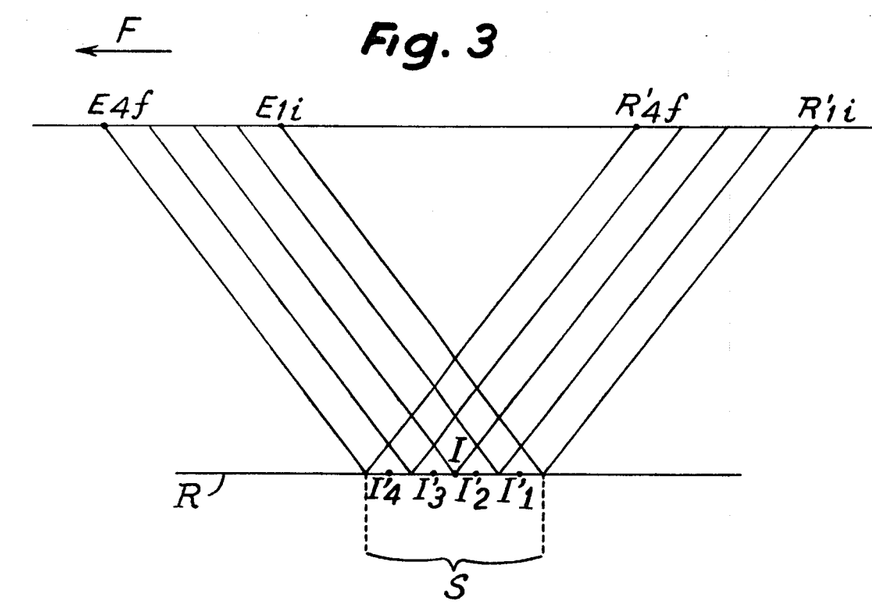
FIG. 3 illustrates another method of carrying the invention into effect.

In a variation illustrated in FIG. 3, long signals of a duration T, which may be greater than or equal to $\theta$, can be sent, these repeating themselves identically and each having an energy lower than the minimum energy required to detect the reflecting bank R. If four signals, for example, are required to reach the essential energy threshold, it will be possible to obtain, from recorded signals, four seismic traces corresponding to the middle points $I'_1$, $I'_2$, $I'_3$ and $I'_4$ of the segments scanned by the mirror point during four successive transmissions. This determination is achieved by the intercorrelation of four portions, of a duration $T_1 + \theta$ and separated by a period $T_1$, of the signals recorded from the transmitted signal having a duration $T_1$; by the operation of adding each of these traces, the depth of the point I on the reflector R at the middle of the segment $I'_1 - I'_4$ will be determined.

The signals received can also be intercorrelated with a long signal of a duration of $4T_1$ made up of four identical successively transmitted signals each having a duration $T_1$, this giving a direct seismic trace characterizing the middle point I of $I'_1 - I'_4$. The total duration $4T_1$ of the four signals, which enable the point I to be determined, must of course be sufficiently short for it to be in fact representative of the segment S scanned by the mirror point during this time.

The advantage of the procedure illustrated in FIG. 3 is that the periodicity $T_1$ of the signal transmitted can be fixed on the basis of the single period $\theta$ for the travel of the longest of the waves, that is to say on the basis of the depth of the most remote reflector that it is required to reach, the energy considerations, which can vary from one zone to another, being only of secondary importance. It is only when processing that it will be determined, with the help of the recording, whether a signal transmitted, for example during a period of $2T_1$, is sufficient to obtain a trace indicating the presence of a reflector corresponding to the travel time $\theta$, by intercorrelating signals recorded during the time $2T_1 + \theta$ with signals transmitted during the period $2T_1$, or whether a longer signal, having a duration of $4T_1$ for example, is necessary for this purpose.

Figures 4, 6:
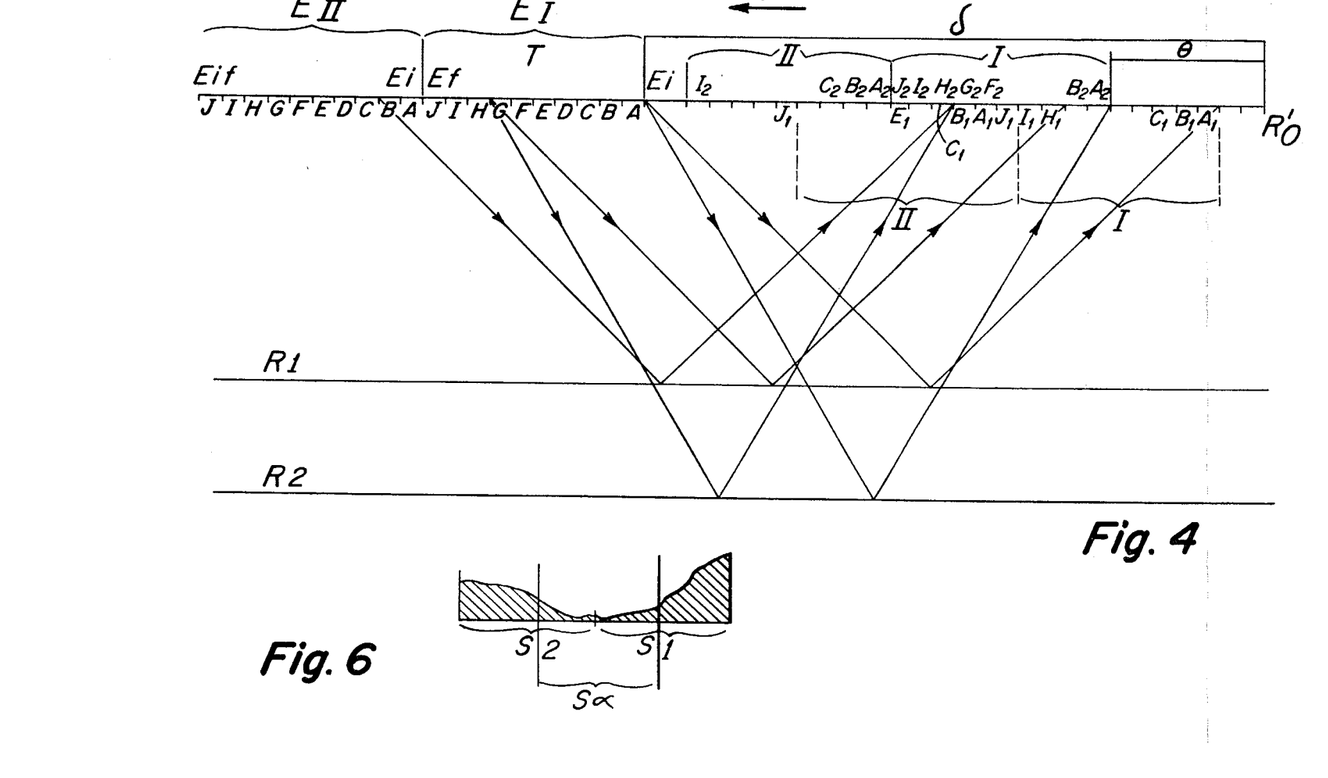
FIG. 4 illustrates the lines of travel of the waves which are reflected at two different reflectors, when using the method of the invention.
FIG. 6 illustrates an explanation of a detail.

FIG. 4 illustrates the path taken by the mechanical waves produced from the transmitted signal in the case where there are two reflectors $R_1$ and $R_2$, the latter being at the maximum depth detectable, that is to say that the travel time of the waves reaching this reflector and returning to the receiver $R'$ is $\theta$. The transmitter E and the receiver $R'$, which are always at the same distance apart $\delta$, move in the direction of the arrow F, the values for their displacement being measured in time. At an initial moment, the transmitter produces, at the position $E_i$, a long signal $E_I$ covering a period T, the passage of which is symbolized by the sequence of letters A, B, C, D, E, F, G, H, I and J; at the end of this signal, the transmitter produces a fresh identical signal $E_{II}$.

At the initial moment, the receiver $R'$ is in the position $R'_0$; the components A, B, C, D, E, F, G, H, I and J of the signals $E_I$ and $E_{II}$ are reflected on the reflector $R_1$ and reach the receiver $R'$ in a series of positions $A_1$, $B_1$, $C_1$, $D_1$, $E_1$, $F_1$, $G_1$, $H_1$, $I_1$, and $J_1$. The bracket I covers those relating to the reception of the signal $E_I$ and the bracket II covers those relating to the reception of the signal $E_{II}$. Similarly the signals $E_I$ and $E_{II}$, the components of which are reflected by the reflector $R_2$, reach the receiver $R'$ in a series of corresponding positions $A_2$, $B_2$, $C_2$, $D_2$, $E_2$, $F_2$, $G_2$, $H_2$, $I_2$ and $J_2$.

Thus, when transmission beings at $E_i$, the component A of the signal $E_I$ which is reflected by $R_1$ reaches the receiver at the point $A_1$ which is the one closest to $R'_0$, and the component A which is reflected by $R_2$ reaches the receiver at the point $A_2$ which is separated from $R'_0$ by the value $\theta$. Due to the fact that there is no interval of silence between the transmission of the signals $E_I$ and $E_{II}$, it is found that there comes a moment when the receiver $R'$ is in a position defined by the coinciding points $C_1$ and $H_2$, where it receives, on the one hand, the component C of the second signal $E_{II}$, as reflected by $R_1$, and, on the other, the component H of the first signal $E_I$ as reflected by $R_2$. Thus there is overlapping in the recording of the signals, as picked up by the receiver, of the end of the first signal reflected by the deepest reflector $R_2$ and the end of the second signal reflected by the first reflector $R_1$. This overlapping does not, however, cause any inconvenience when the portions F, G, H, I and J of the first signal, which overlap the portions A, B, C, D and E of the second signal, are not intercorrelated, that is to say when they are not capable of providing maxima which could be confused with peaks indicating the presence of reflectors; this is the case if the duration T of the signal is more than $\theta$.

One of the interesting features of the method just described stems from the better utilization of the power of the transmission source provided on the vessel, and from the increase in mechanical energy which is transmitted per kilometer of course, as compared with conventional methods. In fact, with conventional methods, two successive points on the reflector explored are separated by a value $V(T + \theta)$, where V is the speed of the vessel. FIG. 2 shows that two points $I_1$ and $I_2$ explored successively using the present method are separated only by the value VT. It is thus clear that, for a given speed of the vessel it is possible to obtain the benefit of a better definition of the profile and, on the other hand, that the apparatus is more fully exploited the nearer T is to $\theta$, that is to say the greater is the power of the transmission equipment aboard the vessel.

On the other hand, as has been shown in the description relating to FIG. 3, it is no longer necessary, as it is with the conventional methods, to predetermine the duration of the long signal to be transmitted in order to obtain a trace indicating the presence of a reflector at a given depth, as a factor affecting consideration of the energy transmitted by this signal.

The method also enables the signals receives to be better utilized in view of the more precise definition of the reflectors explored, since the method offers the possibility of obtaining, by correlation, seismic traces corresponding to intermediate points between the points $I_1$ and $I_2$ which are disclosed by two successive signals $E_1$ and $E_2$ (see FIG. 2).

If, in FIG. 2, a position $E_{\alpha i}$ of the transmitter, between $E_{1t}$ and $E_{1f}$, at the end of the period T is considered, the transmitter will occupy the position $E_{\alpha f}$. Similarly, the receiver will be displaced from $R'_{\alpha i}$ to $R'_{\alpha f}$ and it will be possible to define a middle point $I_\alpha$ of the segment $S_\alpha$ which is scanned by the mirror point M on the reflector R.

Figure 5:
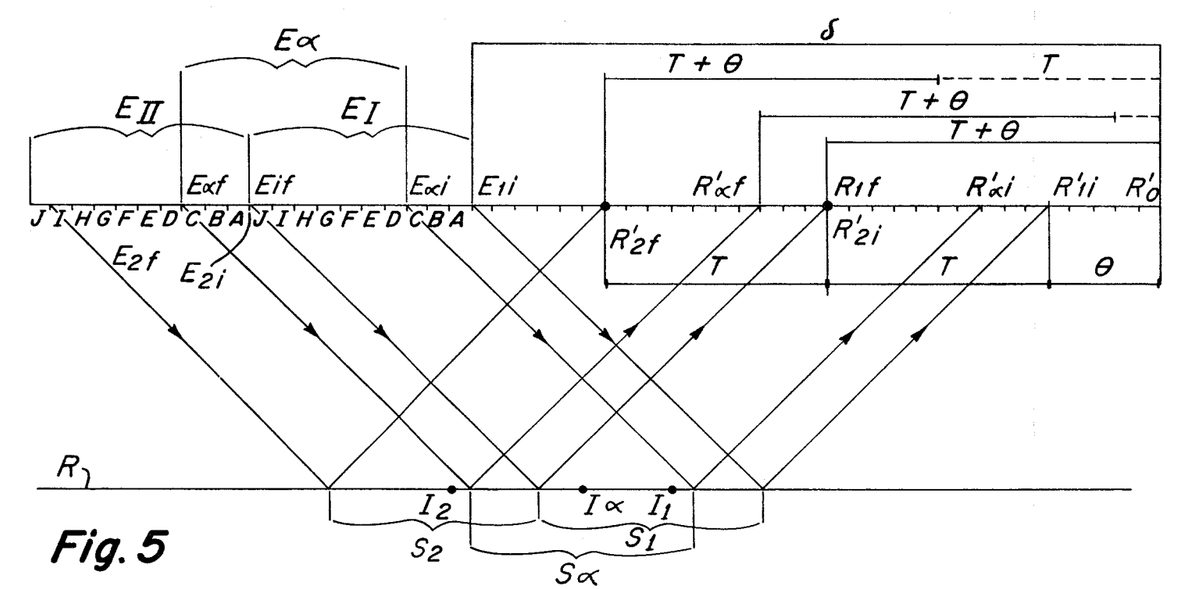
FIG. 5 is an illustration and similar to FIG. 2 but to a larger scale.

FIG. 5 is an illustration, on a larger scale, which is similar to that of FIG. 2. It is assumed that the reflector R is the deepest that it is required to detect, and that the identical signals $E_I$ and $E_{II}$ which are transmitted from the positions $E_{1t}$ and $E_{2t}$, are divided into 10 portions, marked respectively by the letters A, B, C, D, E, F, G, H, I and J. To obtain the point $I_1$, the signal received by the receiver has been intercorrelated with the signal $E_I$ during a period $T + \theta$, starting from the position $R'_0$ thereof which corresponds to the position of the transmitter $E_{1t}$. To obtain the point $I_2$, the transmitted signal $E_{II}$ has been correlated with a portion of the received signal of a duration $T + \theta$, starting at a position of the receiver separated from the point $R'_0$ by the value T.

If a signal $E_\alpha$ which is transmitted between the moments $E_{\alpha i}$ and $E_{\alpha f}$ and which is composed of successive fractions (D, E, F, G, H, I, J) and (A, B, C) of the signals $E_I$ and $E_{II}$ is considered, it is possible to intercorrelate this signal $E_\alpha$ having a duration T with a portion of the signal received having a duration $T + \theta$, including the recording carried out between the positional points $R'_{\alpha i}$ and $R'_{\alpha f}$ of the receiver. This operation makes it possible to determine the depth of the middle point $I_\alpha$ of the segment $S_\alpha$ scanned by the mirror point M following transmission of the signal $E_\alpha$.

The auto-correlation function of the signal $E_\alpha$ (D, E, F, G, H, I, J, A, B, C) is absolutely identical with that of the signals $E_I$ and $E_{II}$. In effect, by modifying the frequencies of the signal, its phase is changed but not its amplitude range nor its power range; this latter is the Fourier conversion of the auto-correlation function. This method thus renders it possible, without supplementary transmissions, since the transmission time is occupied one hundred per cent by the succession of signals $E_I$, $E_{II}$, etc., to determine the position of points between $I_1$ and $I_2$, simply by processing the signals received and recorded, as if signals, such as E, had in fact been transmitted separately. This provision of intermediate traces is possible only because of the continuous transmission and recording of the signals used in the prospecting operation. The traces provided can be used whatever the type of long signal used on transmission, whether they be, in particular, variable-frequency vibratory signals, trains of closely-spaced impulses the envelope of which is likewise of variable frequency, or series of discrete impulses of substantially constant amplitude and conforming to a chance rate of occurrence.

This latter type of long signal is particularly well suited to seismic exploration employing continuous transmission, i.e. conventional long signals of the vibratory type or formed from trains of impulses. It is necessary for the long signal to repeat itself identically in order to retain the same auto-correlation function and, consequently, in order for the autocorrelation function of a reference signal, such as $E_\alpha$, composed of fractions of two successive basic signals, to remain identical to those of these latter signals.

When a chance or random rate of occurrence of impulses of substantially equal amplitudes is selected, the condition of repeating the signal identically to itself is no longer imperative. In effect two signals of this type comprising the same number of impulses, that is to say having the duration T for a given mean rate of transmission, have the same auto-correlation function, this meaning that the ratio of the amplitudes of the secondary peaks to that of the main peak remains the same. The result of this is that it is possible to do without the cyclic character of the continuous transmission involving a succession of identical long signals, if use if made of chance series of impulses of substantially equal amplitudes; the continuous transmission can consist of a series of non-cyclic impulses of chance occurrence over a period of several hours, this transmission being controlled, for example, by graphs recorded on magnetic tapes, (or even directly by a generator of chance signals). It is then possible to intercorrelate a predetermined portion, of a duration $T' + \theta$, of the signal received with a corresponding portion of the transmitted signal having the duration $T'$, which period can be selected as may be required without it being necessary to be concerned with anything else but the requirements imposed by good definition of the peaks of the intercorrelation function at the moment at which the recordings are used. This period $T'$ is thus no longer limited to the duration of the transmission cycle of a long signal, as with the other types of signal.

The possibility of providing seismic traces corresponding to intermediate points, thanks to the continuous transmission method, does not enable new information relating to the profile of the reflectors explored to be provided; it enables the information contained in the signals received and recorded to be better utilized. Thus, if the definition of the points $I_1$ and $I_2$ is suitable, the method does not provide any supplementary indication. On the other hand, if this definition is relatively poor due, for example, to a relatively high speed of travel of the vessel, it enables the outline of the reflector to be determined. Thus, in seismic traces corresponding to deep reflectors, or when the noise picked up by the receivers at the same time as the reflected waves is considerable, it may be that there is doubt as to the value to be attached to a peak of the intercorrelation function, that is to say that it is not known if this peak corresponds to a particularly high noise during the transmission cycle or to the reflection of the waves actually transmitted. In this case, the recurrence of such a peak at the same abscissa for intermediate intercorrelation functions enables all doubt to be removed and continuity of the mirror to be assured.

FIG. 6 illustrates a further application and shows schematically, by means of hatched zones, the amplitude of the noise recorded for each position of the point M scanning the segments $S_1$ and $S_2$ corresponding to two successive transmissions $E_I$ and $E_{II}$. The intercorrelation functions of the signals corresponding to the segments $S_1$ and $S_2$ are difficult to utilize because of the very considerable accidental noise at the moment at which the mirror point was scanning certain portions of these segments. It may happen that there is a segment $S \alpha$ which overlaps these two segments and which has been scanned at a moment at which the noise was considerably weaker. The intercorrelation function corresponding to $S \alpha$ will then have a very sharp maximum, the source of which cannot be doubted.

Also, in certain geological areas, the reflectors may exhibit considerable local variations in their coefficient of reflection, and these variations can interfere considerably with the intercorrelation function corresponding to a given segment. The increased analytical precision resulting from the possibility of obtaining intermediate traces enables the effect of these variations to be reduced and even for their presence to be marked and their magnitude to be ascertained.

Theoretically there is no limit to the number of seismic traces that can be obtained between two traces corresponding to two transmissions of successive discrete long signals.

Figure 7:
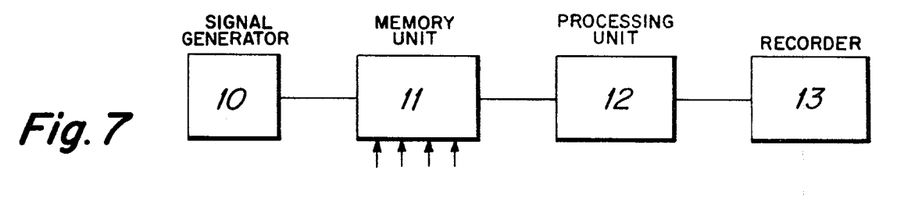
FIG. 7 shows schematically an arrangement of apparatus for operating the method of the invention.

The method that has been described can be operated with apparatus as illustrated schematically in FIG. 7. This apparatus can be constructed in a way which is similar to those known in long signal methods. It comprises four essential parts, which include a transmission signal generator 10; the signal may be constituted by a linear variation of the frequency of a sinusoidal signal or by a series of impulses occurring in a chance fashion. There may be obtained from generators which enable several categories of variable-length signals to be produced and which are able to function during long periods without causing slip in the times at which the transmitted signals occur.

The controlled signals produced by the generator 10 and the received signals are recorded simultaneously by a memory unit 11, which may comprise, for example, a loop of magnetic tape. Such tapes are used in stacking apparatus such as is employed for operating conventional impulse prospecting methods and they enable several recordings to be added in situ in a numerical system. The volume of this memory unit is suited to the duration T of the long signal transmitted by the generator 10 plus the duration $\theta$ of the time taken by the waves to reach and return from the maximum required exploration depth.

The signals recorded in the memory unit 11 are intercorrelated (or cross-correlated) by means of a processing unit 12. The exact nature of the operation carried out by this correlation apparatus (which is a correlation-addition operation) depends upon the nature of the signal transmitted and the method used, and on whether the method is of the kind illustrated in FIG. 2 of in FIG. 3. The correlation or addition means are well known in the long-signal or stacking methods.

The unit 12 delivers to a recorder 13 which functions continuously during the entire prospecting period during which the vessel operates. This apparatus 13 records the adjacent seismic traces coming from various receivers, as well as time reference marks which are positioned at regular intervals and which enable the continuous record to be cut up subsequently into independent traces, which can then be used for multiple screening treatments, space-time filtering operations, deconvolution treatments, etc.

Preferably, the above-mentioned items of apparatus operate in a numerical or digital system, since this endows them with excellent characteristics as regards speed, which permits a signal to be found amidst a large number of other items of information.

I claim:

1. A method of seismic exploration in a medium which comprises the steps of:
   a. providing a transmitter of long seismic signals formed of a series of discrete impulses and causing this transmitter to travel in a continuous manner relative to the medium,
   b. providing at least one receiver for reflected seismic signals and causing it to travel relative to the medium, at a constant distance from the transmitter,
   c. providing a recorder for signals received by said receiver and means for intercorrelating portions of the transmitted and received signals,
   d. operating said transmitter so that it transmits into said medium seismic signals which are received by said medium after having been reflected back through said medium by at least one seismic reflector, the transmission time of each said long signal being at least equal to the travel time of the seismic signals which reach said receiver by way of the furthest reflector, said transmitted signals following each other in a continuous manner and the received signals being recorded without interruption during the period of exploration along a selected area, and
   e. intercorrelating any portions of the transmitted signals with corresponding portions of the received signals as recorded to obtain trace information relating to successive points along each reflector explored.

2. A method of exploration according to claim 1, wherein said recorded signals are also intercorrelated with intermediate signals each of which is composed of an end portion of one transmitted signal followed by an initial portion of the next transmitted signal.

3. A method of exploration according to claim 1, wherein trace data characterizing each point on a reflector which is identified is obtained by a mixed operation of correlating and adding a plurality of substantially identical successive long signals and portions of signals corresponding to those received.

4. A method of exploration according to claim 1 wherein each of long signals which is transmitted is formed of a series of discrete impulses of substantially constant amplitude conforming to a chance rate of occurrence.

5. A method of exploration according to claim 4, wherein the said succession of long signals is obtained from a non-cyclic transmission of discrete impulses of substantially constant amplitude which conform to a chance rate of occurrence.

* * * * *